United States Patent
Lin et al.

(10) Patent No.: US 8,188,722 B2
(45) Date of Patent: May 29, 2012

(54) DC GAIN IMPROVEMENT OF A DIGITALLY CONTROLLED DC-DC CONVERTER BY LSB TUNING

(75) Inventors: Yu-Cheng Lin, Pingtung (TW); Yen-Tang Wang, Taipei (TW); Dan Chen, Taipei (TW); Wei-Hsu Chang, Jubei (TW)

(73) Assignee: Richtek Technology Corp., Hsinchu (TW)

( * ) Notice: Subject to any disclaimer, the term of this patent is extended or adjusted under 35 U.S.C. 154(b) by 425 days.

(21) Appl. No.: 12/588,106

(22) Filed: Oct. 5, 2009

(65) Prior Publication Data
US 2010/0090672 A1    Apr. 15, 2010

(30) Foreign Application Priority Data
Oct. 9, 2008    (TW) .............................. 97139049 A

(51) Int. Cl.
*G05B 11/14*    (2006.01)
(52) U.S. Cl. .............................. 323/283; 700/31; 700/71
(58) Field of Classification Search .................. 323/283; 700/31, 37, 54, 71, 89
See application file for complete search history.

(56) References Cited

U.S. PATENT DOCUMENTS

| | | | |
|---|---|---|---|
| 2006/0276915 A1* | 12/2006 | Kelly | 700/44 |
| 2007/0250186 A1* | 10/2007 | Higuchi et al. | 700/37 |
| 2008/0010474 A1* | 1/2008 | Chapuis | 713/300 |

OTHER PUBLICATIONS

Antonio Petraglia, Coefficient Inaccuracy Effects in Recursive Analog Sampled-Data Filters, 1993 IEEE International Symposium on Circuits and Systems, 1993, ISCAS '93, 1993, pp. 1030-1033.*

* cited by examiner

*Primary Examiner* — Harry Behm
(74) *Attorney, Agent, or Firm* — Rosenberg, Klein & Lee

(57) ABSTRACT

An easy LSB tuning method is proposed for a digitally controlled DC-DC converter to increase the DC gain of the digitally controlled DC-DC converter under conditions of no-limit-cycle and a finite bit number to reduce steady-state error of the digitally controlled DC-DC converter. The LSB of one or more of the coefficients in the denominator of the discrete-time domain transfer function of the digital compensator in the digitally controlled DC-DC converter is so tuned that the sum of all coefficients in the denominator of the discrete-time domain transfer function becomes zero. Therefore, the influence of round-off effect on the coefficients of the digital compensator is mitigated.

2 Claims, 6 Drawing Sheets

DC GAIN IMPROVEMENT OF A DIGITALLY CONTROLLED DC-DC CONVERTER BY LSB TUNING

FIELD OF THE INVENTION

The present invention is related generally to a digitally controlled DC-DC converter and, more particularly, to DC gain improvement of a digitally controlled DC-DC converter.

BACKGROUND OF THE INVENTION

Recently, applications of digital control in DC-DC converters have attracted much attention. Digital control features stable control parameters, programmability, less passive components and easy implementation of advanced control algorithms, among other advantages. According to most literature on digitally controlled DC-DC converters, the frequency response presented is above 1 kHz, and with advancement in the measurement technology, the frequency response can now be measured to an accuracy of 10 Hz. Accordingly, it has been found that digitally controlled DC-DC converters suffer from an insufficient DC gain which, through analysis, is ascertained to arise from round-off effect.

As shown in FIG. 1, a digitally controlled DC-DC converter 10 includes a power stage 12 to convert an input voltage Vin into an output voltage Vo according to a PWM signal S3, a voltage divider 20 to divide the output voltage Vo to generate a feedback voltage Vd, an analog-to-digital converter (ADC) 18 to convert the analog voltage Vd into a digital signal S1, a digital compensator 16 for compensation of the digital signal S1 to generate a digital feedback signal S2, and a digital pulse width modulator (DPWM) 14 to generate the PWM signal S3 according to the digital signal S2. Generally, almost all analog compensators used in DC-DC converters include an integrator to provide an infinite DC gain, which makes the output voltage of the DC-DC converters equal to a preset voltage and thereby achieves zero error. After digitization, the coefficients of the digital compensator 16 are rounded off, and therefore an error occurs during the integration process, making it impossible for the output voltage Vo of the DC-DC converter 10 to stabilize at the preset voltage. An ideal integrator has a pole located at 0 Hz, which location is nevertheless very easily changed by round-off effect. More particularly, a pole located at a lower frequency is more susceptible to round-off effect. In other words, the lower frequency the pole is located at, the more the pole will displace due to round-off effect, and consequently the smaller the DC gain will be.

FIG. 2 is a diagram showing the frequency response of the digitally controlled DC-DC converter 10, in which waveform 22 represents the loop gain obtained when each coefficient of the digital compensator 16 has nine decimal bits, waveform 24 represents the loop gain obtained when each coefficient of the digital compensator 16 has twelve decimal bits, waveform 26 represents the loop gain obtained when each coefficient of the digital compensator 16 has sixteen decimal bits, waveform 28 represents the phase obtained when each coefficient of the digital compensator 16 has nine decimal bits, waveform 30 represents the phase obtained when each coefficient of the digital compensator 16 has twelve decimal bits, and waveform 32 represents the phase obtained when each coefficient of the digital compensator 16 has sixteen decimal bits. As shown in FIG. 2, the more decimal bits the coefficient of the digital compensator 16 has, the higher the loop gain of the DC-DC converter 10 in low frequency range will be. Therefore, to mitigate the influence of round-off effect on the coefficients of the digital compensator 16, a digital compensator 16 having more bits is often used, which however increases costs as well as computational complexity.

Up to now, the design of digital controllers for DC-DC converters has been much discussed in related literature, and in view of the fact that the ADC 18 and the digital pulse width modulator 14 in the feedback circuit sometimes cause limit-cycle oscillations, discussion has also been made on the non-linear ADC 18 and the digital pulse width modulator 14 in the feedback circuit, with a view of designing an infinite-cycle digital controller. However, methods for DC gain improvement of the digitally controlled DC-DC converter 10 are still unavailable in the academia and the industry. Hence, it is desired a method for effectively improving the DC gain of a digitally controlled DC-DC converter under conditions of no-limit-cycle and a finite bit number to reduce steady-state error thereof.

SUMMARY OF THE INVENTION

An object of the present invention is to provide a method for DC gain improvement of a digitally controlled DC-DC converter.

A digitally controlled DC-DC converter includes a power stage to convert an input voltage into an output voltage according to a first signal, an analogy-to-digital converter to convert an analogy signal related to the output voltage into a digital signal, a digital compensator for compensation of the digital signal to generate a second signal, and a digital pulse width modulator to provide the first signal according to the second signal. A method according to the present invention checks if the sum of all coefficients in the denominator of the discrete-time domain transfer function of the digital compensator is zero, and if the sum is not zero, tunes the LSB of one or more of the coefficients in the denominator of the discrete-time domain transfer function such that the sum of all coefficients in the denominator of the discrete-time domain transfer function of the digital compensator becomes zero.

With the proposed method, the DC gain of the digitally controlled DC-DC converter is improved without increasing the number of decimal bits of the coefficients of the digital compensator, and thus cost and computational complexity will not be increased.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
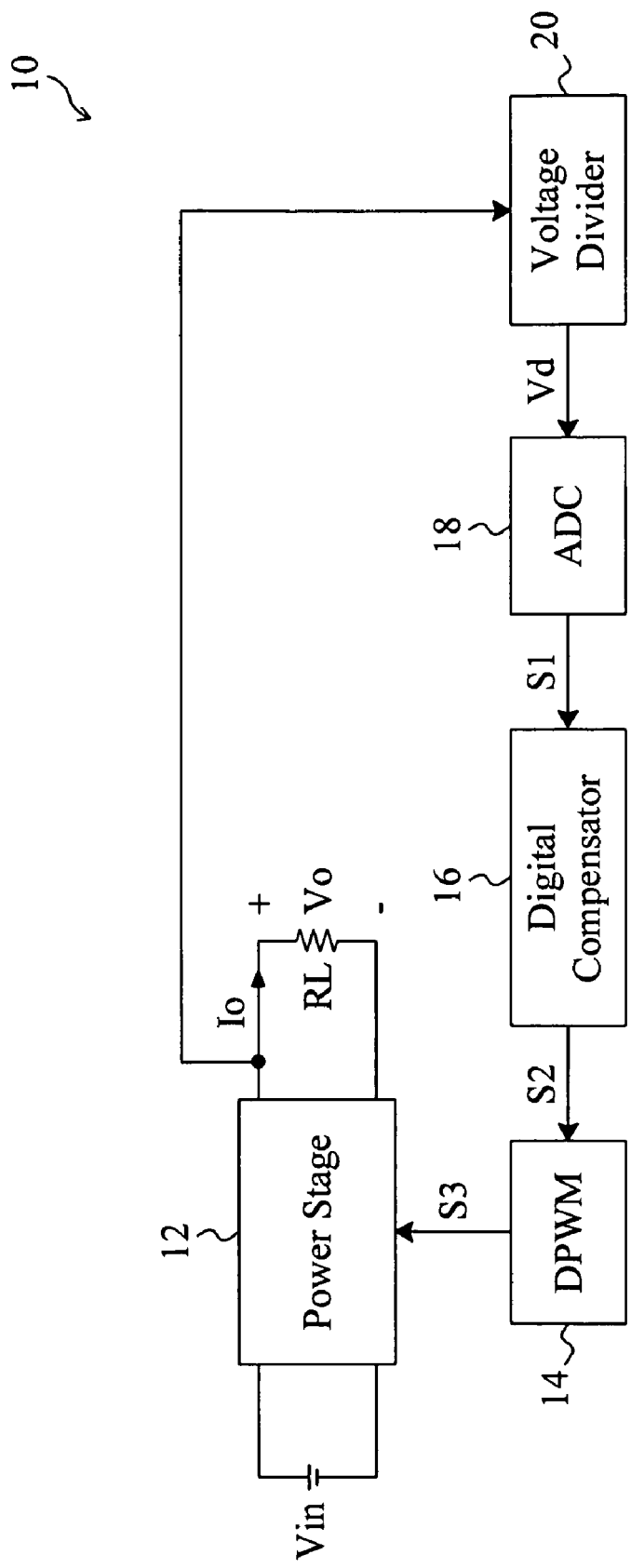
FIG. 1 is a systematic diagram of a digitally controlled DC-DC converter.
Figure 2:
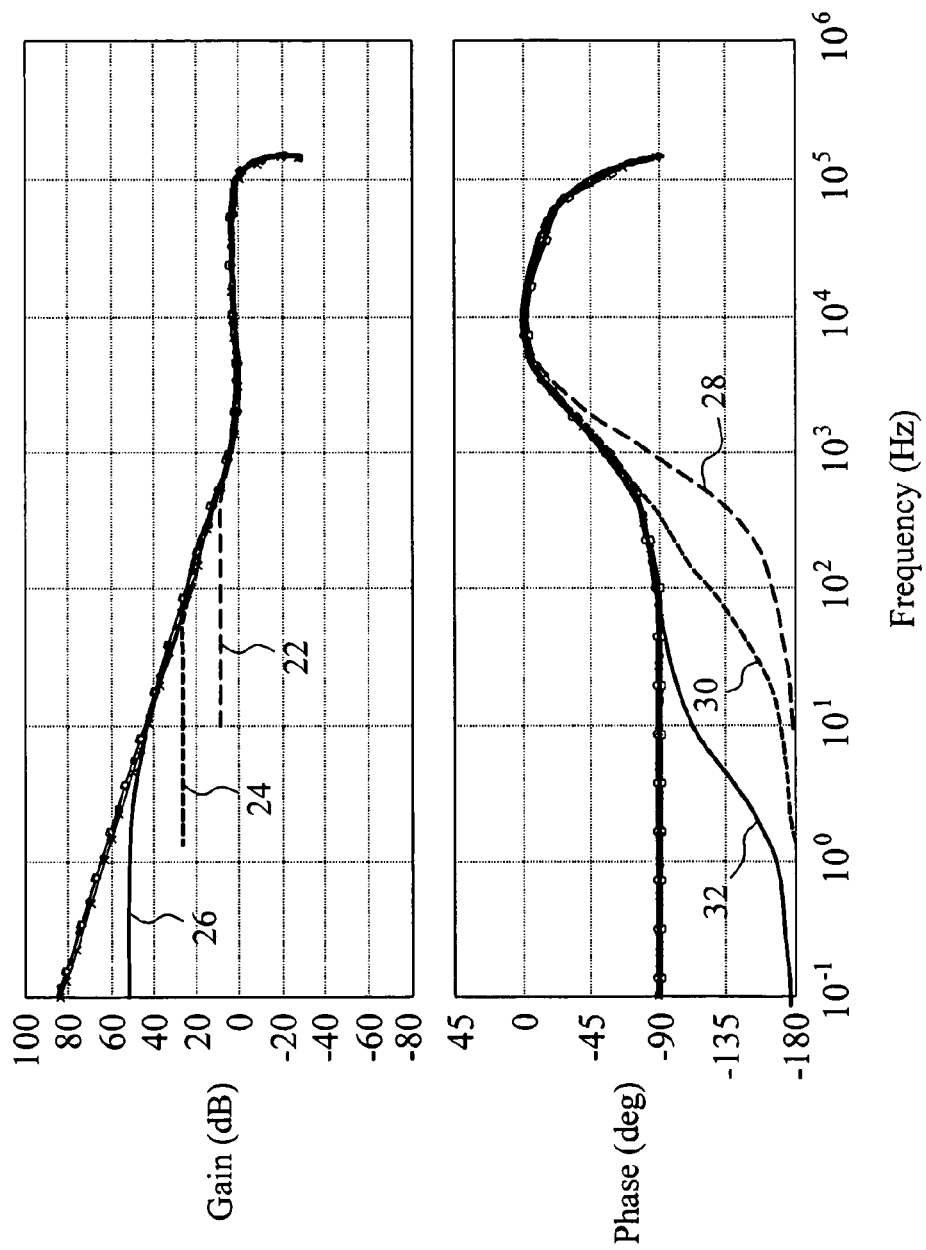
FIG. 2 is a diagram showing the frequency response of the digitally controlled DC-DC converter shown in FIG. 1.

Referring to FIG. 1, the digital compensator 16 in the digitally controlled DC-DC converter 10 has a discrete-time domain transfer function, or otherwise termed z-domain transfer function $$Comp_D(z) = \frac{\sum_{i=0}^{n} b_i \cdot z^{-i}}{1 + \sum_{i=1}^{n} a_i \cdot z^{-i}}, \quad [\text{Eq-1}]$$

where $a_i$ and $b_i$ are coefficients, and $i$ is a constant. By substituting $z=1$ into the equation Eq-1, the z-domain transfer function in low-frequency range is obtained $$Comp_D(1) = \frac{\sum_{i=0}^{n} b_i}{1 + \sum_{i=1}^{n} a_i}. \quad [\text{Eq-2}]$$

When using infinite-length floating-point number representation, the sum of all coefficients in the denominator of the z-domain transfer function $Comp_D(1)$ is zero. However, when finite-length floating-point number representation is adopted, due to round-off effect, the sum of the coefficients in the denominator of the z-domain transfer function $Comp_D(1)$ will not be zero, thereby leading to a decrease in the DC gain. To increase the DC gain, some coefficients in the denominator of the z-domain transfer function $Comp_D(1)$ is tuned with a Least Significant Bit (LSB) order to bring the sum of all coefficients in the denominator of the z-domain transfer function $Comp_D(1)$ to zero.

Figure 3:
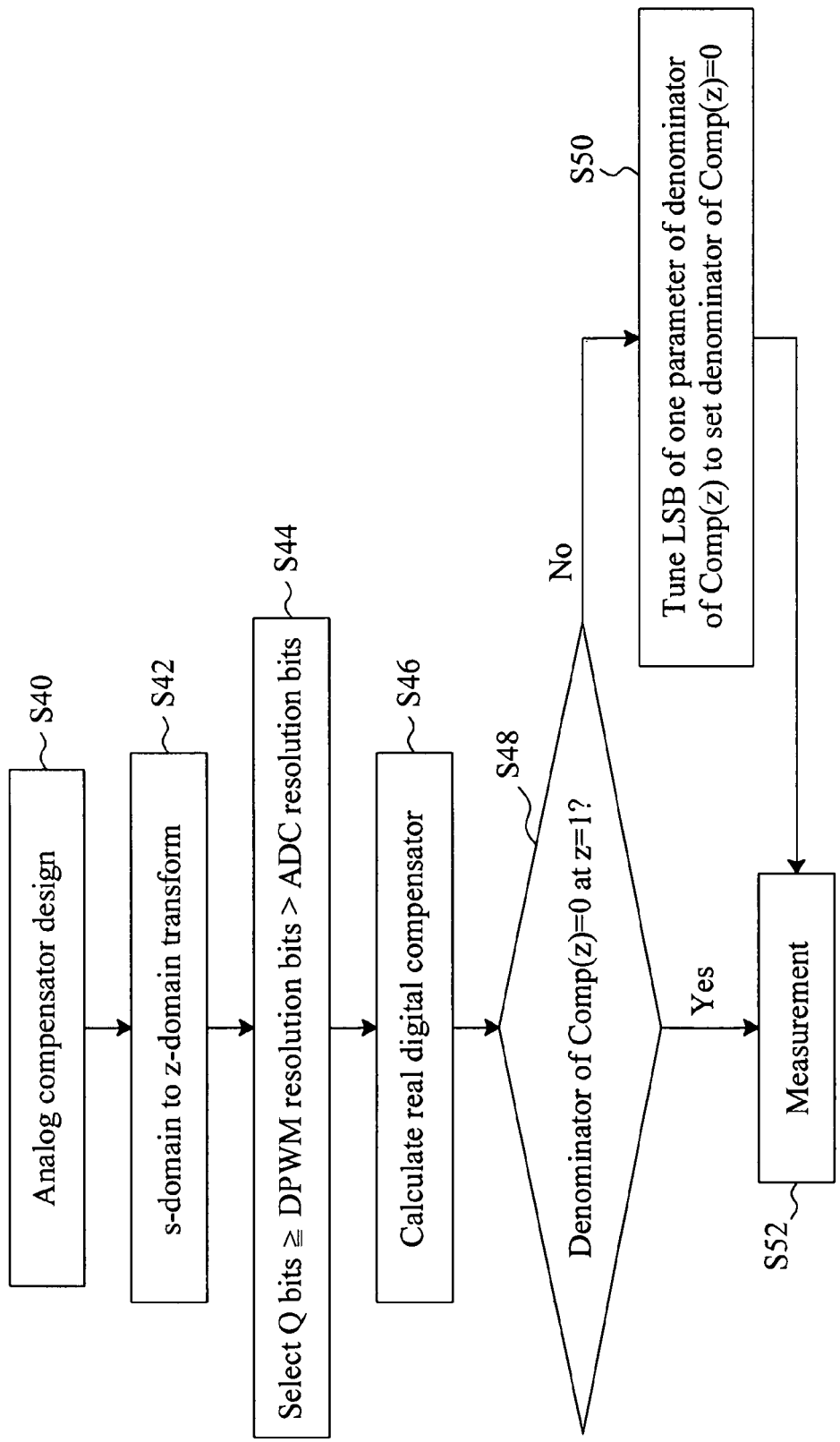
FIG. 3 is a design flowchart of a digital compensator for the digitally controlled DC-DC converter of FIG. 1.
Figure 4:
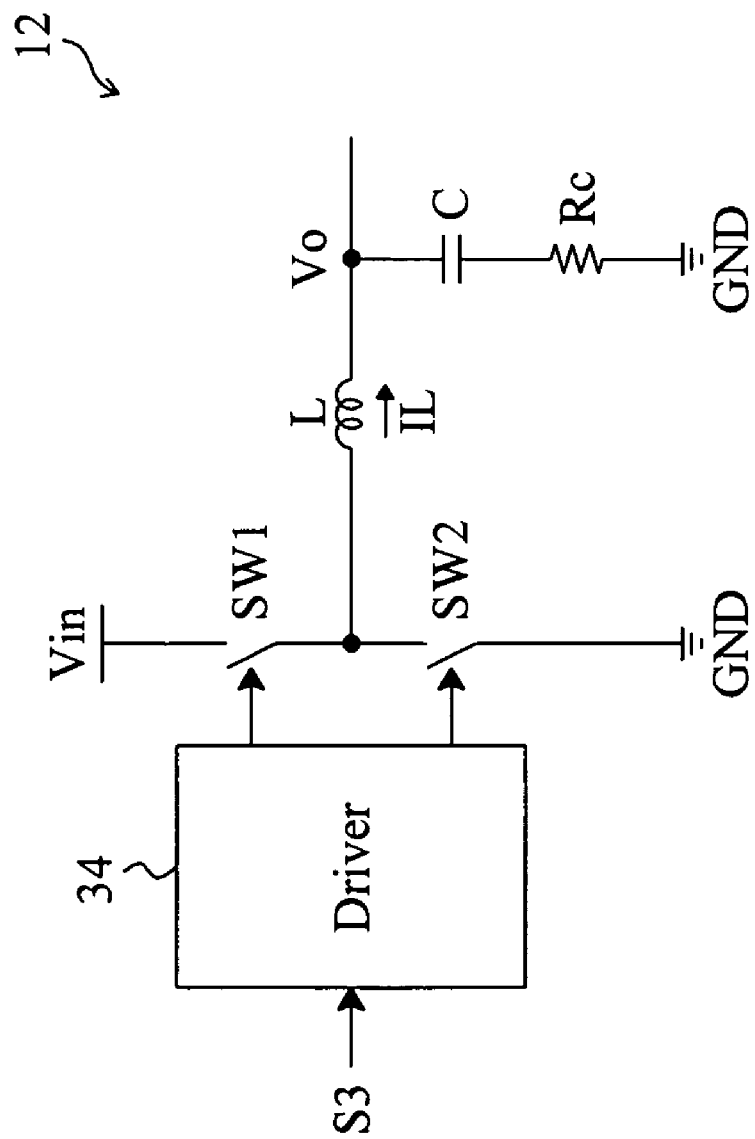
FIG. 4 is a circuit diagram of an embodiment of the power stage shown in FIG. 1.

For clearer understanding of the present invention, FIG. 3 provides a design flowchart of the digital compensator 16 shown in FIG. 1. FIG. 4 is a circuit diagram of an embodiment of the power stage 12 shown in FIG. 1, which includes a driver 34 to switch power switches SW1 and SW2 serially connected between the voltage input Vin and ground GND according to the PWM signal S3, to control an inductor current IL charging a capacitor C to generate the output voltage Vo. Referring to FIGS. 1, 3, and 4, assumed that the inductor L has an inductance 3.3 μH, the capacitor C has a capacitance 1,300 μF, the resistor Rc has a resistance 20 mΩ, the load RL has a resistance 100 mΩ, the input voltage Vin is 3V, and the output voltage Vo is 1.5V, at first an analog compensator design is accomplished with the above parameters in step S40, by which a continuous-time domain transfer function, or otherwise termed s-domain transfer function, is defined $$Comp_A(s) = \frac{10000 \cdot \left(1 + \frac{s}{15000}\right) \cdot \left(1 + \frac{s}{16000}\right)}{s \cdot \left(1 + \frac{s}{38462}\right) \cdot \left(1 + \frac{s}{188496}\right)}. \quad [\text{Eq-3}]$$

Then, in step S42, the s-domain transfer function $Comp_A(s)$ is transformed into a z-domain transfer function $Comp_D(z)$ by means of bilinear transformation process. If the sampling frequency is $$Ts = \frac{512}{150 \times 10^6} = 3.413 \text{ μsec}, \quad [\text{Eq-4}]$$

the z-domain transfer function is represented as $$Comp_D(z) = \frac{b_0 + b_1 \cdot z^{-1} + b_2 \cdot z^{-2} + b_3 \cdot z^{-3}}{1 + a_1 \cdot z^{-1} + a_2 \cdot z^{-2} + a_3 \cdot z^{-3}}, \quad [\text{Eq-5}]$$

where the coefficients are $b_0 = (0.38661518080114)_{10}$, $b_1 = -(0.34663267373375)_{10}$, $b_2 = -(0.38558248582738)_{10}$, $b_3 = (0.34766536870751)_{10}$, $a_1 = -(2.38840170444833)_{10}$, $a_2 = (1.83711279536419)_{10}$, $a_3 = -(0.44871109091587)_{10}$.

Next, step S44 selects the number of decimal bits of the coefficients a's and b's of the digital compensator 16, the number of resolution bits of the DPWM 14, and the number of resolution bits of the ADC 18 such that the number of decimal bits of the coefficients a's and b's of the digital compensator 16 ≦ the number of resolution bits of the DPWM 14 > the number of resolution bits of the ADC 18, for example, twelve bits, nine bits and eight bits, respectively. Step S46 calculate the real digital compensator 16. In particular, according to the selected numbers of bits, the compensator parameters after round-off in hexadecimal notation are $b_0' = (0.62F)_{16}$, $b_1' = -(0.58B)_{16}$, $b_2' = -(0.62B)_{16}$, $b_3' = (0.590)_{16}$, $a_1' = -(2.636)_{16}$, $a_2' = (1.D64)_{16}$, $a_3' = -(0.72D)_{16}$.

Then, step S48 checks if the sum of all coefficients 1, $a_1'$, $a_2'$, $a_3'$ in the denominator of the transfer function $Comp_D(z)$ is zero at $z=1$. If it is, then step S52 follows for subsequent measurement; otherwise, step S50 is executed to tune the LSB of one parameter of the denominator of the transfer function $Comp_D(z)$ to set the sum of the coefficients 1, $a_1'$, $a_2'$, $a_3'$ in the denominator of the transfer function $Comp_D(z)$ to be zero. In this embodiment, the sum of the coefficients in the denominator of the transfer function $Comp_D(1)$ is $Den_D(1) = 1 + a_1' + a_2' + a_3' = +(0.001)_{16} \neq 0$.

Therefore, one or more of $a_1'$, $a_2'$, $a_3'$ is selected to tune the LSB thereof such that $Den_D(1)=0$. For example, the coefficient $a_1'$ is tuned from $-(2.636)_{16}$ to $-(2.637)_{16}$.

Figure 5:
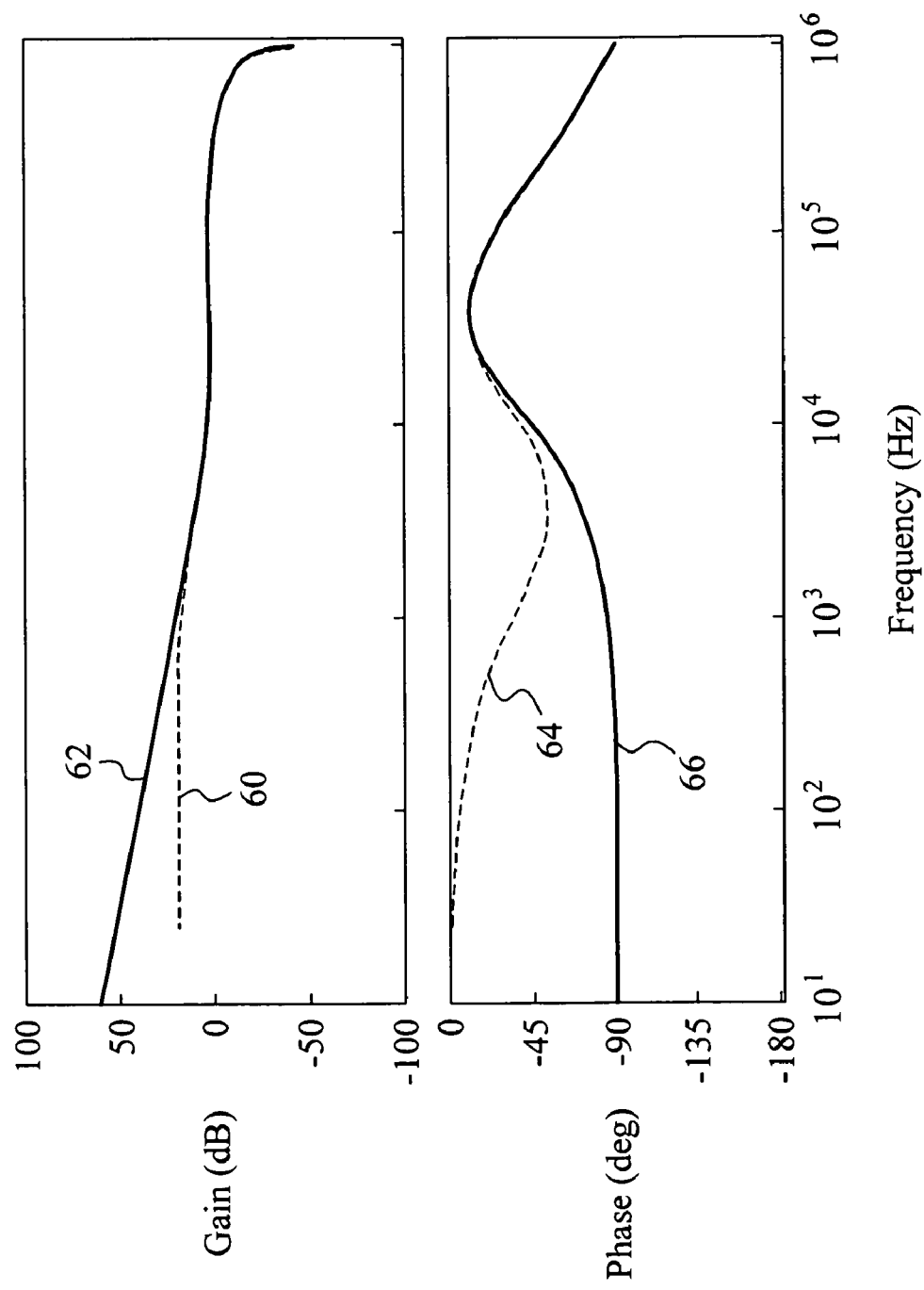
FIG. 5 is a comparison diagram of the frequency response of the digitally controlled DC-DC converter shown in FIG. 1 before and after an LSB tuning.
Figure 6:
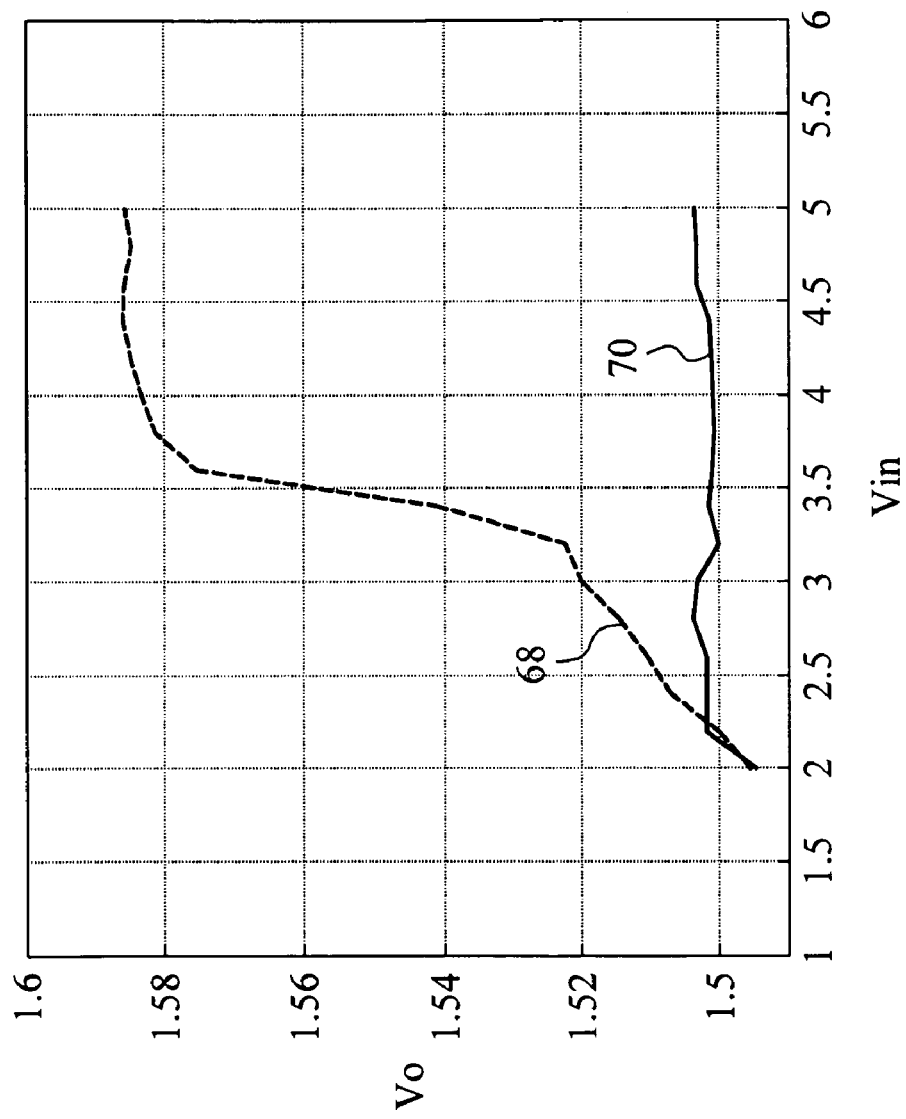
FIG. 6 is a comparison diagram of the output voltage of the digitally controlled DC-DC converter shown in FIG. 1 before and after an LSB tuning.

FIG. 5 is a comparison diagram of the frequency response of the digitally controlled DC-DC converter 10 before and after the LSB tuning, in which waveform 60 represents the loop gain of the digitally controlled DC-DC converter 10 before the LSB tuning, waveform 62 represents the loop gain of the digitally controlled DC-DC converter 10 after the LSB tuning, waveform 64 represents the phase of the digitally controlled DC-DC converter 10 before the LSB tuning, and waveform 66 represents the phase of the digitally controlled DC-DC converter 10 after the LSB tuning. As can be clearly seen in FIG. 5, after the LSB tuning, the digitally controlled DC-DC converter 10 exhibits a better DC gain. FIG. 6 is a comparison diagram of the output voltage Vo of the digitally controlled DC-DC converter 10 before and after the LSB tuning, in which waveform 68 represents the output voltage Vo of the digitally controlled DC-DC converter 10 before the LSB tuning, and waveform 70 represents the output voltage Vo of the digitally controlled DC-DC converter 10 after the LSB tuning. As shown in FIG. 6, after the LSB tuning, the output voltage Vo of the digitally controlled DC-DC converter 10 becomes more stable.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for DC gain improvement of a digitally controlled DC-DC converter including a power stage to convert an input voltage into an output voltage according to a first signal, an analog-to-digital converter to convert an analog signal related to the output voltage into a digital signal, a digital compensator for compensation of the digital signal to generate a second signal, and a digital pulse width modulator to provide the first signal according to the second signal, the method comprising the steps of:
    checking if the sum of all coefficients in the denominator of a discrete-time domain transfer function of the digital compensator is zero; and
    if the sum is not zero, tuning the least significant bit of one or more of the coefficients in the denominator of the discrete-time domain transfer function such that the sum of all coefficients in the denominator of the discrete-time domain transfer function of the digital compensator becomes zero.

2. The method of claim 1, wherein the number of decimal bits of the coefficients of the digital compensator is greater than or equal to the number of resolution bits of the digital pulse width modulator, and the number of resolution bits of the digital pulse width modulator is greater than the number of resolution bits of the analog-to-digital converter.

* * * * *